Oct. 27, 1959  E. W. JAMES  2,909,931
GYROSCOPE

Filed Oct. 22, 1952  2 Sheets-Sheet 1

INVENTOR.
EDWARD W. JAMES
BY
Busser, Smith & Harding
ATTORNEYS

Oct. 27, 1959

E. W. JAMES 2,909,931

GYROSCOPE

Filed Oct. 22, 1952

INVENTOR.
EDWARD W. JAMES
BY
ATTORNEYS

United States Patent Office 2,909,931
Patented Oct. 27, 1959

2,909,931

GYROSCOPE

Edward W. James, Newtown Square, Pa., assignor to Sun Oil Company, Philadelphia, Pa., a corporation of New Jersey Application October 22, 1952, Serial No. 316,165

3 Claims. (Cl. 74—5.6)

This invention relates to gyroscopes and has particular reference to correction for azimuthal drift and restraint of tilt, the invention being particularly applicable to a gyroscope to be used in an odograph though, as will become evident hereafter, the invention is of much broader applicability.

In the use of a gyroscope to provide a reference for the measurement of azimuth the spin axis of the gyroscope rotor is generally desirably approximately horizontal. The approximately horizontal position of the spin axis may be that of parallelism to the plane of the deck or floor of the vehicle by which it is carried. As will become evident hereafter, bearing in mind the application of the gyroscope to an odograph involving a motor vehicle for land operation, the spin axis may be maintained, in general, parallel to the floor of such a vehicle. In accordance with the present invention, the spin axis is maintained generally parallel to the floor of the vehicle only in the sense that correction of its position is accomplished when deviations from parallelism are excessive. It has been found that if an attempt is made to provide for parallelism at substantially all times, there are required connections which introduce frictional restraint on the vertical gyroscope axis which, in accordance with gyroscope theory, would cause precession about the horizontal axis. While such precession, if free, would not create rotation about the vertical axis, there is inevitably some restraint against movement about the horizontal axis and this is reflected in movement about the vertical axis. Accordingly, in accordance with the present invention, the production of corrective precession about the horizontal axis is limited to short intervals of time and to periods when precession about the horizontal axis is necessary to avoid having occur limiting positions at which "tumbling" of the gyroscope would occur with loss of its ability to indicate azimuth. In accordance with the foregoing, there is provided a detector of tilt about the horizontal axis. When the signal indicative of tilt becomes greater than a predetermined value, elements are rendered operative to provide a torque about the vertical axis which will produce a corrective precession about the horizontal axis. By providing corrections in this fashion, there is minimized restraint on free movement of the vertical axis within its bearings with, in turn, a minimizing of the necessity for corrective action.

A further aspect of the invention has to do with correction of the output indications from the gyroscope for drift. As is well known, drift of a gyroscope is inevitable due to unbalance about the tilt axis, restraint by elements such as flexible leads, friction from contacts or slip rings, and bearing friction. Any torques thus resulting about the tilt axis will cause precession of the gyroscope in azimuth. Contributing also to drift is "apparent precession." A gyroscope will tend to maintain its direction in space, but usually interest is centered on its position relative to the earth which is moving in space. If a perfect gyroscope, free of friction, restraint and unbalance were set with its spin axis horizontal and in a north-south direction in the northern hemisphere, the north end of its spin axis would tend to drift eastwardly and tilt upwardly but still remain fixed in space. This motion is due only to rotation of the earth, but in practice there is no way to separate it from drifts due to other causes.

In accordance with the present invention, drift due both to motion of the earth and defects of the gyroscope is permitted to occur and correction is introduced into the azimuth output means. In fact, it has been found advantageous to provide a substantial drift in a single direction. If an attempt is made to eliminate drift, the attempt may be successful to the end that at least at certain times there is no appreciable drift. This means that when turning of the vehicle occurs, there must be overcome a static friction at the vertical bearings which will have a different value from the dynamic friction which exists when the motion is continued. Such static friction is, of course, unpredictable in amount and, apparently, is non-uniform, the result being to impart incremental drifts in azimuth which are not susceptible to correction. When, in accordance with the present invention, a predetermined drift is continuously maintained, the static conditions are minimized and entering into the picture are lesser disturbing torques with the result that the overall maintenance of azimuth indications is greatly improved.

The general objects of the invention involve the attainment of the results and operations above discussed. These general objects, as well as other objects relating particularly to details of construction and operation, will become apparent from the following description read in conjunction with the accompanying drawings, in which.

Figure 1:
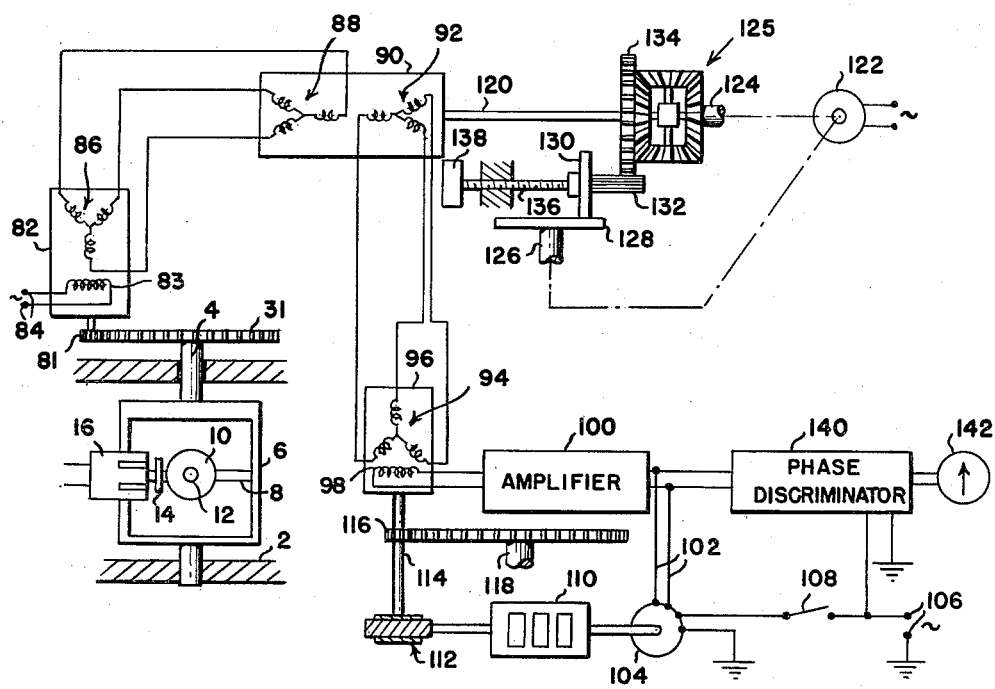
Figure 1 is a diagram showing a gyroscope and associated apparatus, the apparatus illustrated in this figure being that particularly concerned with the delivery of azimuth indications under conditions of existence of a reasonably uniform drift.
Figure 2:
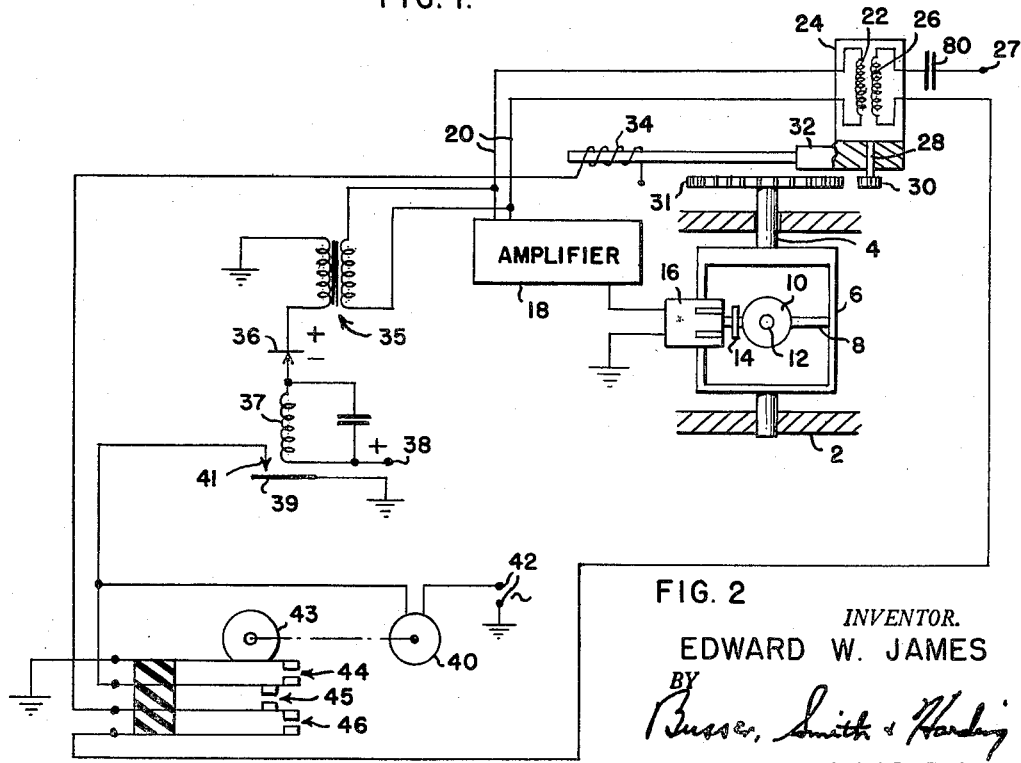
Figure 2 is a diagram showing the same gyroscope associated with apparatus particularly involved in the correction of tilt in intermittent fashion.

There is indicated at 2 a support for the gyroscope which may be regarded as maintaining the vertical axis of the gyroscope perpendicular to the floor of a vehicle, the vertical axis being that of the trunnions 4 of the gimbal 6. As heretofore indicated the present invention is particularly applicable when the gyroscope is to provide the azimuth reference means for an odograph constituted by apparatus carried by a land vehicle such as a motor truck or trailer. Under most conditions the floor of such a vehicle will be at least approximately horizontal, the deviations in a fore and aft direction being due to the climbing or descent of hills, while transverse deviations would be due to the banking or slope of shoulders of roads, etc. For simplicity, therefore, the axis about which the gimbal 6 turns will be referred to as the vertical axis, though this expression may not be strictly true, since the axis will be mounted in bearings so as to be perpendicular to the floor of the vehicle; but, in a sense, the axis will be vertical from an average standpoint.

Details of the bearings are not illustrated herein since it will be understood that the bearings, and in fact the entire construction of the mechanical parts of the gyroscope, will be in accord with good practice providing for minimum of frictional torque or other restraint productive of torque, freedom from play to as great an extent as possible in the bearings, provision for maintenance of uniform rotor speed, exclusion of dust, etc. It is also highly desirable to enclose the gyroscope in a housing which will maintain close control of temperature by the use of a cooling system under thermostatic control.

The gimbal 6 supports the horizontal or tilt axis of the gyroscope, this axis being that of trunnions 8 carried by the housing 10 in which is enclosed the gyroscope rotor having its spin axis approximately horizontal as indicated at 12. The gyroscope may, of course, be of electrically driven or pneumatically driven type. It will be understood, in what follows, that the gyroscope is well balanced in accordance with usual practice, to maintain precession at a low value, though as will be apparent from the foregoing discussion, and as will appear hereafter, it is desirable to provide sufficient slow drift in azimuth to avoid the possibility that under any conditions which may be encountered a reversal of direction of drift might occur.

Any relative motion between the gyroscope housing 10 and its gimbal 6 involving a tilt about the horizontal axis is detected by the movement of an armature 14 carried by the housing 10 with respect to an E-coil 16 constituting a pick-up arrangement the nature and connections of which will be further detailed hereafter. In general, it may be said that the E-coil pick-up is designed to provide a signal the phase of which depends upon the direction of the angular movement of tilt just mentioned. The signal from this pick-up is delivered to an amplifier 18 which produces at its output through connections 20 a phased current in the variable phase coil 22 of a two-phase motor 24 the main coil of which, indicated at 26, is provided with alternating current from the power source. The shaft 28 of motor 24 carries a pinion 30. The motor 24 is carried by a sliding support 32 which is connected to the plunger of a solenoid 34 which, when energized, serves to move the pinion 30 into mesh with the gear 31 carried by vertical shaft 4 of the gimbal.

The amplifier 18 also delivers its output to a transformer 35, the secondary of which is connected through a diode 36 and a relay coil 37 to a terminal 38 which is maintained at a suitable positive potential. The arrangement is such that current will not flow through the relay coil 37 until the amplifier output exceeds a suitable level. The armature of the relay, indicated at 39, is grounded and is normally out of engagement with the contact point 41. A geared-down slow speed motor 40 is provided with alternating current from treminals 42, being connected to the contact point 41 of the relay so that its circuit is normally open. The motor drives a cam 43 which is arranged to operate a multiple leaf switch comprising leaves with the respective pairs of contacts 44, 45 and 46. As will be clear from the diagram, these contacts are so arranged as to be engaged in succession under the action of the cam at intervals determined by their spacings. The upper contact of the pair 44 is grounded. The lower contact of the pair 44 and the upper contact of the pair 45 are connected to the relay contact point 41. The lower contact of the pair 45 and the upper contact of the pair 46 are connected to one end of the relay coil 34 the other end of which is connected to a power terminal. The lower contact of the pair 46 is connected to one end of the coil 26 of motor 24.

The circuit just described has the following operation:

Under ordinary conditions of approximately horizontal position of the gyroscope spin axis the pinion 30 is disengaged from gear 31, the relay coil 37 is deenergized, and the motor 40 is stationary with the cam 43 in such position as to leave open the contacts at 44, 45 and 46. The fact that the pinion 30 is disengaged from gear 31 leaves the gimbal 6 free from any restraint imposed by the motor 24. Accordingly, it may rotate freely in its bearings without the imposition of a load by the motor which would provide a restraining torque and cause precession about the tilt axis. When tilt about the axis 8 occurs, a signal will be delivered from the pickup 16 to the amplifier, which signal has a phase depending upon the direction of deviation from the horizontal. Until this signal exceeds a predetermined amplitude, there will be no flow of current through the relay coil 37. When the predetermined amplitude is exceeded, the relay will ground the contact point 41 which will result in closure of the circuit of motor 40 which will start rotation of cam 43. The first effect of this rotation is to close the contacts at 44 providing a ground connection for the motor 40 in addition to that provided at point 41, the result being to insure a complete rotation of cam 43. As rotation further proceeds, the contacts at 45 will be closed, producing energization of solenoid 34 to move pinion 30 into mesh with gear 31. At this time the motor 24 is deenergized and, consequently, the motion of the pinion into mesh with the gear is under conditions involving no application of torque to the gear, the teeth going smoothly into mesh with such rotation of the motor shaft as may be required. Following this, the contacts at 46 are closed. The motor 24 accordingly has its coil 26 energized and coil 22 is also energized from the amplifier output, the phase of the latter energization being dependent upon the direction of tilt of the gyroscope spin axis. The result is that the motor 24 will impart a torque to the vertical gimbal. This torque will not produce a motion about the vertical axis, but, as is usual, will produce a precession of the gyroscope about the tilt axis 8 and in such direction as to correct the tilt, moving the spin axis toward its horizontal position. If during the rotation of cam 43 the corrective action is completed to the extent that the signal from the amplifier is reduced to such extent as to deenergize the coil 37, the cam 43 will make one revolution and then come to a stop, the contacts at 44, 45 and 46 being open. It may be noted that when the corrective action occurs fully, the output from the amplifier will drop to zero and, consequently, the torque imparted to the vertical gimbal will be removed. If correction does not occur in a single revolution of cam 43, a second or subsequent revolutions will occur until the correction occurs at least to such extent as to deenergize the coil 37.

From the foregoing it will be evident that the correction of tilt occurs only intermittently and when required, the vertical axis being under no restaint except during corrective periods. By so choosing the potential at terminal 38 as to prevent energization of relay 37 except under conditions of substantial deviation of the spin axis from the horizontal, or more properly from a perpendicular relationship to the axis of gimbal 6, the corrective actions may be caused to occur only at well spaced intervals, and only when the tilt becomes such as to involve the possibility of "tumbling". The result, therefore, is to achieve correction under conditions involving a minimum of restraint to free rotation of the gimbal about its vertical axis.

The various component parts of the apparatus so far described are, in general, conventional but there may be described with reference to Figure 3 the electrical apparatus between the E-coil pick-up and the motor 24. The E-coil pick-up is of conventional type involving a field core of E-shape the legs of which carry windings 54, 56 and 58, there moving adjacent to the ends of the legs of the core the armature 14 previously described. With alternating current applied as indicated to the central winding 54 and with the coils 56 and 58 properly wound and interconnected, the arrangement is extremely sensitive to the deviation of the armature 14 from a null position relative to the core, the output being reversed in phase as deviation takes place from one side to the other of the null position. The resulting signal is fed to a pair of amplifier tubes indicated at 60 and 62 in conventional amplifier arrangement, the output from the second stage being delivered through condenser 64 to the control grid of a pentode 66 the anode 70 of which is connected through condenser 72 to the control grid of a companion pentode 68. The anodes 70 and 74 of the respective pentodes 66 and 68 are connected to the opposite ends of the coil 22 of motor 24, which coil is shunted by a condenser 78. The power input to the other coil 26 of motor 24 is through a condenser 80 to secure the proper phase relationships.

Figure 3:
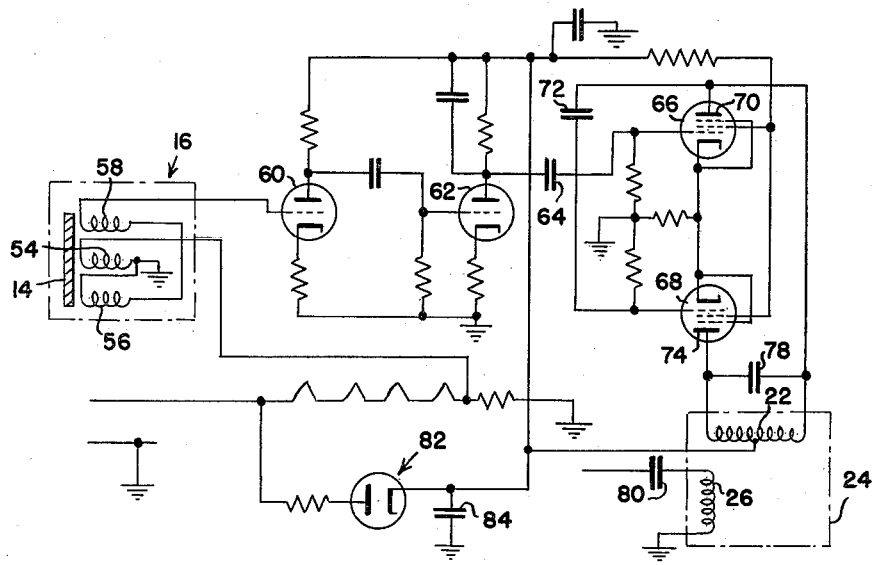
Figure 3 is a detailed wiring diagram showing certain of the elements illustrated in Figure 2.

The direct power supply to the system illustrated in Figure 3 may be through a half-wave rectifier arrangement 82 with simple filtering by means of a condenser 84 since it is not requisite that well-filtered direct current be supplied.

It will be evident that the particular means employed as described above may be replaced by other means without departing from the invention. For example, such replacement by equivalent devices may be effected at the E-coil pick-up which obviously may be replaced by other suitable means for the indication of deviations from a null position and the sign of such deviations, there being capable of use, for example, photoelectric cell devices or even sensitive contact arrangements of mechanical type. The small torques required to be applied to the vertical spindle of the gyroscope may be secured in fashions other than through the use of a motor such as 24. The electrical elements of the device including the amplifying means are also susceptible to a wide variety of choices.

The foregoing description has been concerned with the devices for limiting tilt of the gyroscope. To be useful for control, as in an odograph, the gyroscope must deliver azimuth indications or signals, and consistently with what has been described above there must be introduced correcting means for the delivered signal to compensate for the continuous drift which is desirably involved.

To provide a take-off from the gyroscope which will impose a minimum of restraint on the vertical axis and to provide for the drift correction, there is preferably used the apparatus disclosed particularly in Figure 1. The gear 31 carried by the vertical spindle is in constant mesh with a pinion 81 which is secured to the rotor shaft of a so-called "autosyn" transmitter. This transmitter diagrammed at 82 comprises a single winding 83 connected to alternating current supply terminals 84 and a three-phase type of winding indicated at 86 which is connected to output lines. One of these windings is carried by the rotor and the other by the stator, there being delivered through the output lines currents such that between pairs of these lines there are voltages 120° out of phase with each other, with the phases of these voltages dependent upon the position of the rotor shaft.

At 90 there is indicated a so-called "differential autosyn" which comprises a rotor and a stator each carrying a three-phase type of winding. One of these indicated at 88 receives its input from the winding 86 of transmitter 82. The other indicated at 92 delivers an output to an "autosyn" receiver 96 which is similar in construction to the transmitter 82 being provided with a three-phase type of winding 94 receiving its input from the winding 92, and a single phase winding 98 which delivers its output to an amplifier 100. The autosyn elements which have been described are well known and conventional and need not be detailed. It will suffice to say that, if the amplifier 100 has a high input impedance, the arrangement described imposes a very small load on the gyroscope, essentially that of the friction involved in the bearings of the transmitter 82, there being negligible electrical load.

The alternating signal received by the amplifier 100 corresponds to the input at terminals 84 but shifted in phase in dependence upon the position of the transmitter shaft, the position of the shaft 120 of the differential autosyn, and the position of the shaft 114 of the receiver 96. The output of the amplifier 100 is delivered through connections 102 to a reversible two-phase induction motor 104, the lines 102 supplying one of the phases, the other phase being supplied with current from the alternating supply terminals 106 through a switch 108 which during operation is normally closed. The motor 104 drives a counter 110 and through a worm reduction gearing indicated at 112 the shaft 114 of the receiver 96. The shaft 114 is geared through reduction gearing 116 to the azimuth output signal shaft 118. The motor 104 supplies the power for the drive of the shaft 118 which may be connected to the devices which are to utilize the azimuth signals from the gyroscope arrangement. For example, this shaft may provide an azimuth signal to an odograph.

Provision is made for the turning of the shaft 120 of the differential autosyn at a slow rate corresponding to the drift of the gyroscope. To secure such drive, the shaft 120 is driven from a synchronous motor 122 through devices which, in effect, provide a continuously adjustable very high gear reduction. For this purpose, the synchronous motor 122 drives through shaft 124 one input of a planetary gear arrangement indicated at 125. The motor 122 also drives a shaft 126 provided with a disc 128 serving to drive a follower wheel 130 which through an elongated pinion 132 and a gear 134 provides the second input to the planetary gear arrangement 125. The position of the disc 130 is adjustable radially with respect to the disc 128 by means of a screw 136 adjustable by a knob 138. By virtue of this arrangement, with suitable radial position of the wheel 130 relative to disc 128, the output of the planetary mechanism 125 delivered through the shaft 120 of the differential autosyn may be adjusted to zero or to a very low rate of rotation in one direction or the other as may be required to compensate for drift.

The operation of the arrangement in Figure 1 is as follows:

Assuming, first, that the gyroscope has zero drift, rotation of the spindle 4 relative to the carrying vehicle will vary the phase of the output from the transmitter, and, the differential autosyn being stationary, a corresponding variable phase signal will be delivered to the amplifier 100. The output of this amplifier will drive the motor 104 in one direction or the other depending upon the relationship of the phase of the signal delivered at 102 to that of the input from terminals 106, these terminals being supplied from the same source as the input terminals 84. The arrangement is such that the motor will rotate the shaft 114 to produce at the output of the amplifier a signal such that its phase relationship to the input 106 will stop the motor 104. There is thus provided a power positioning of shaft 114 in precise correspondence to the positioning of the shaft or spindle 4 with respect to a fixed datum of the vehicle. Since the motor 104 may operate at quite high speed, it will be evident that the corresponding positions of the shafts will be substantially instantaneously the same. The amplifier 100 is of conventional type embodying, desirably, damping control of usual type to prevent hunting of the motor 104. The counter 110 which is geared to a high ratio with respect to the shaft 118 gives a visual indication of the turning of the vehicle in azimuth. For example, the counter may, with suitable choice of gearing, read to an accuracy of $\frac{1}{10}°$.

Assuming, now, that the gyroscope has a substantially constant drift, if adjustment of the knob 138 is made so that the shaft 120 has a rotational rate corresponding to the drift, there will be a continuous shifting of phase corresponding to the drift which will produce a retrograde rotation of the output shaft 118 to eliminate the drift. Thus, with a constant drift of the gyroscope, the output shaft may give accurate azimuth signals of true value. The true value of azimuth will, of course, be indicated on the counter 110.

As has been noted above, it is desirable to adjust the gyroscope to the extent of a predetermined unbalance to try to provide a uniform drift. The extent of drift in a given interval of time may be readily ascertained if, during that interval, switch 108 is opened and motor 122 is deenergized, so that, when the switch is closed the motor 104 will operate to move the counter to the extent of the drift. Similar observations may be made with motor 122 operating and with different settings of knob 138 to obtain the desired settings to balance out the drift. In order to facilitate setting of the knob 138, there is desirably provided a phase discriminator 140 and a meter 142 receiving the output from the amplifier 100, the meter 142 giving an indication of the amount of drift secured by a particular setting of the knob 138 when the apparatus is in running condition but with the vehicle stopped.

Figure 4:
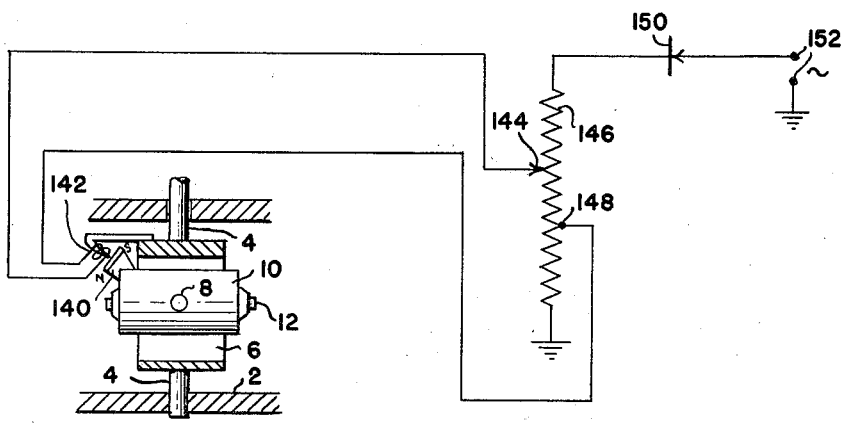
Figure 4 is a diagram showing in particular the provision of means for establishing under electrical control a torque about the tilt axis.

The drift of the gyroscope may be set by adjustment of unbalancing weights providing a torque about the horizontal axis. Inasmuch, however, as the gyroscope is desirably fully enclosed, and, as stated above, has its temperature automatically controlled, access to balancing weights is unsatisfactory for adjustment of the drift and, accordingly, it is desirable to provide electrical drift adjustment providing a tilting torque as indicated in Figure 4.

The rotor housing 10 carries a permanent magnet 140 in the field of an electromagnet 142 which is connected between the adjustable contact 144 of a potentiometer 146 and a center tap 148 of this potentiometer. Direct current flow through the potentiometer is provided by the arrangement in series with it of a diode 150, alternating current being provided to the series arrangement of the potentiometer and diode from therminals 152. An adjustable and reversible torque is thus provided about the horizontal axis to secure the desired drift.

The arrangement just described might indicate the possibility of automatic drift correction to the extent of reducing the drift to zero by causing the position of the contact 144 to be automatically controlled. However, this expedient has been found not to be desirable inasmuch as unpredictable torques are then involved due to unpredictable starting friction. For this reason it is desirable to introduce a definite torque and corresponding constant drift. It will, of course, be understood that precise constancy of drift is not attainable, there being inevitably variations in drift due to circumstances which defy recognition. Operation in accordance with the foregoing, however, minimizes drift difficulties and reduces the errors due to drift to a substantial degree making azimuth indications possible to a high degree of accuracy.

What is claimed is:

1. In a gyroscope system, a gyroscope having a gimbal mounted on a first axis and its rotor housing mounted on a second axis in said gimbal, means providing a first electrical signal having a phase corresponding to the position of the gimbal about said first axis, means effecting a phase shift of said first signal to provide a second signal, an output device, means receiving said second signal and responsive to the position of said output device to provide a third signal, and means receiving said third signal and controlling said output device to cause the latter to assume a position corresponding to the resultant of the position of said gimbal about said first axis and the magnitude of said phase shift.

2. In a gyroscope system, a gyroscope having a gimbal mounted on a first axis and its rotor housing mounted on a second axis in said gimbal, means providing a first electrical signal having a phase corresponding to the position of the gimbal about said first axis, means effecting a continuously varying phase shift of said first signal to provide a second signal, an output device, means receiving said second signal and responsive to the position of said output device to provide a third signal, and means receiving said third signal and controlling said output device to cause the latter to assume a position corresponding to the resultant of the position of said gimbal about said first axis and the magnitude of said phase shift.

3. In a gyroscope system, a gyroscope having a gimbal mounted on a first axis and its rotor housing mounted on a second axis in said gimbal, means providing a first electrical signal having a phase corresponding to the position of the gimbal about said first axis, adjustable means effecting a continuously varying phase shift of predetermined rate of change of said first signal to provide a second signal, an output device, means receiving said second signal and responsive to the position of said output device to provide a third signal, and means receiving said third signal and controlling said output device to cause the latter to assume a position corresponding to the resultant of the position of said gimbal about said first axis and the magnitude of said phase shift.

References Cited in the file of this patent

UNITED STATES PATENTS

| | | |
|---|---|---|
| 2,220,055 | Fischel et al. | Oct. 29, 1940 |
| 2,410,473 | Weems | Nov. 5, 1946 |
| 2,412,614 | Haskins et al. | Dec. 17, 1946 |
| 2,421,247 | Davis | May 27, 1947 |
| 2,524,756 | Braddon et al. | Oct. 10, 1950 |
| 2,552,132 | Anderson | May 8, 1951 |
| 2,561,367 | Haskins | July 24, 1951 |
| 2,597,151 | Konet | May 20, 1952 |

FOREIGN PATENTS

| | | |
|---|---|---|
| 108,776 | Great Britain | Aug. 23, 1917 |
| 623,009 | Great Britain | May 11, 1949 |